(12) United States Patent
Ichikawa et al.

(10) Patent No.: US 8,947,046 B2
(45) Date of Patent: Feb. 3, 2015

(54) POWER FEEDING SYSTEM AND VEHICLE

(75) Inventors: Shinji Ichikawa, Toyota (JP); Toru Nakamura, Toyota (JP); Kazuyoshi Takada, Kariya (JP); Sadanori Suzuki, Kariya (JP); Shimpei Sakoda, Kariya (JP); Yukihiro Yamamoto, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 295 days.

(21) Appl. No.: 13/697,133

(22) PCT Filed: May 26, 2011

(86) PCT No.: PCT/IB2011/001125
§ 371 (c)(1),
(2), (4) Date: Nov. 9, 2012

(87) PCT Pub. No.: WO2011/148254
PCT Pub. Date: Dec. 1, 2011

(65) Prior Publication Data
US 2013/0057207 A1 Mar. 7, 2013

(30) Foreign Application Priority Data

May 26, 2010 (JP) ................................. 2010-120226

(51) Int. Cl.
*H01M 10/46* (2006.01)
*B60L 11/18* (2006.01)
(Continued)

(52) U.S. Cl.
CPC ............... *B60L 11/182* (2013.01); *B60K 6/445* (2013.01); *B60L 11/123* (2013.01); *B60L 11/14* (2013.01);
(Continued)

(58) Field of Classification Search
USPC .......................... 320/104, 107, 108, 132, 137
See application file for complete search history.

(56) References Cited

U.S. PATENT DOCUMENTS

2008/0278264 A1* 11/2008 Karalis et al. ................. 307/104
2010/0115474 A1 5/2010 Takada et al.
(Continued)

FOREIGN PATENT DOCUMENTS

CA        2 738 120 A1    4/2010
JP        A-2001-238372    8/2001
(Continued)

OTHER PUBLICATIONS

Apr. 9, 2012 Japanese Office Action issued in Japanese Patent Application No. 2010-120226 (with translation).
(Continued)

*Primary Examiner* — Edward Tso
(74) *Attorney, Agent, or Firm* — Oliff PLC (57) ABSTRACT

A power feeding system is provided, in which a detected value of reflected power at a power supply device in a power feeding installation is sent from the power feeding installation to a vehicle via a first communication device, the vehicle has an impedance matching device for adjusting an impedance at a resonance system that is constituted of a power transmission resonator, including a primary self-resonant coil and a primary coil in the power feeding installation, and a power receiving resonator, including a secondary self-resonant coil and a secondary coil in the vehicle, and the impedance matching device is controlled based on the detected value of the reflected power at the power supply device, which has been received from the power feeding installation.

15 Claims, 6 Drawing Sheets

(51) Int. Cl.
*B60K 6/445* (2007.10)
*B60L 11/12* (2006.01)
*B60L 11/14* (2006.01)
*H02J 5/00* (2006.01)

(52) U.S. Cl.
CPC ............ *B60L 11/1838* (2013.01); *H02J 5/005* (2013.01); *B60L 2220/14* (2013.01); *Y02T 10/6217* (2013.01); *Y02T 10/6239* (2013.01); *Y02T 10/7005* (2013.01); *Y02T 10/7077* (2013.01); *Y02T 10/7088* (2013.01); *Y02T 90/122* (2013.01); *Y02T 90/128* (2013.01); *Y02T 90/14* (2013.01); *Y02T 90/16* (2013.01); *Y02T 90/163* (2013.01)
USPC ........................................................ 320/108

(56) References Cited

U.S. PATENT DOCUMENTS

| | | |
|---|---|---|
| 2010/0225271 A1 | 9/2010 | Oyobe et al. |
| 2011/0121778 A1 | 5/2011 | Oyobe et al. |
| 2011/0231029 A1* | 9/2011 | Ichikawa et al. .............. 320/108 |
| 2012/0032525 A1 | 2/2012 | Oyobe et al. |
| 2012/0091953 A1* | 4/2012 | Paryani et al. ................ 320/109 |
| 2012/0112691 A1* | 5/2012 | Kurs et al. ..................... 320/108 |

FOREIGN PATENT DOCUMENTS

| | | |
|---|---|---|
| JP | A-2002-272134 | 9/2002 |
| JP | A-2009-106136 | 5/2009 |
| JP | A-2010-114965 | 5/2010 |
| JP | A-2010-141977 | 6/2010 |
| JP | A-2011-166885 | 8/2011 |
| WO | WO 2010/035321 A1 | 4/2010 |

OTHER PUBLICATIONS

Imura et al., "Wireless Power Transfer during Displacement Using Electromagnetic Coupling in Resonance," *Transactions D of Institute of Electrical Engineers*, 2010, pp. 76-83, vol. 130, No. 1, The Institute of Electrical Engineers of Japan (with Abstract).

Partial English-language translation of Office Action issued in Japanese Patent Application No. 2010-120226 dated Jun. 21, 2012.

* cited by examiner

POWER FEEDING SYSTEM AND VEHICLE

BACKGROUND OF THE INVENTION

1. Field of the Invention

The invention relates to a power feeding system and a vehicle, and the invention particularly relates to a power feeding system in which power is wirelessly fed from a power feeding installation to a vehicle by a power transmission resonator provided in the power feeding installation and a power receiving resonator provided in the vehicle resonating with each other via an electromagnetic field, and relates to a vehicle.

2. Description of the Related Art

Great attention has been focused on electrically powered vehicles, such as electric vehicles and hybrid vehicles, as environment-friendly vehicles. These vehicles incorporate an electric motor for producing drive force to propel the vehicle, and a rechargeable power storage for storing power to be supplied to the electric motor. Note that "hybrid vehicles" refer to vehicles incorporating an internal combustion engine as a motive power source in addition to the electric motor (or motors), vehicles further incorporating a fuel cell, in addition to the power storage, as a direct current power source for driving the vehicle, and so on.

Among the hybrid vehicles, a vehicle is known which allows charging of an in-vehicle power storage from a power source external to the vehicle, likewise with an electric vehicle. For example, a so-called "plug-in hybrid vehicle" is known which allows a power storage to be charged from a general household power supply by connecting, using a power cable, a plug socket located at a house with a charging inlet provided at the vehicle.

As a method for power transmission, attention has recently been focused on wireless power transmission not using power supply cords and/or power transmission cables. Three promising approaches of the wireless power transmission technique are known, i.e. power transmission using electromagnetic induction, power transmission using microwaves, and power transmission using the resonance method.

The resonance method is a contactless, or wireless, power transmission technique that causes a pair of resonators (e.g., a pair of resonant coils) to resonate with each other in an electromagnetic field (near field), thus transmitting power via the electromagnetic field. Using the resonance method, for example, power as high as several kW can be transmitted over a relatively large distance (for example, several meters).

For example, Japanese Patent Application Publication No. 2009-106136 (JP-A-2009-106136) describes a power feeding system that uses the resonance method to wirelessly feed power to a vehicle from a power feeding installation external to the vehicle.

In power feeding systems using the resonance method, such as the one described above, in order to achieve efficient power feeding from the power feeding installation to the vehicle, the input impedance at the resonance system that is constituted of a power transmission resonator in the power feeding installation and a power receiving resonator in the vehicle needs to be matched to the impedance at the power supply section from which power is supplied to the power transmission resonator. If these impedances are not matched to each other, the power reflected to the power supply device becomes large, and thus the power feeding is not efficient.

JP-A-2009-106136 does not specifically describe any concrete impedance adjustment (matching) method. Further, preferably, an impedance adjustment is accomplished with a structure as simple as possible.

SUMMARY OF THE INVENTION

The invention provides a power feeding system and a vehicle using the resonance method, each enabling efficient power feeding but being simple in structure.

A power feeding system according to a first aspect of the invention includes a power feeding installation and a power receiving unit to which the power feeding installation feeds power. The power feeding installation has a power supply device, a power transmission resonator, and a first communication device. The power supply device produces power having a predetermined frequency. The power transmission resonator receives the power produced by the power supply device and generates an electromagnetic field via which the power is wirelessly transmitted to the power receiving unit. The first communication device sends power information on power at the power feeding installation to the power receiving unit. The power receiving unit has a power receiving resonator, an impedance matching device, a second communication device, and a controller. The power receiving resonator wirelessly receives the power from the power transmission resonator by resonating with the power transmission resonator via the electromagnetic field. The impedance matching device is used to adjust an impedance at a resonance system that is constituted of the power transmission resonator and the power receiving resonator. The second communication device receives the power information sent from the first communication device. The controller controls the impedance matching device based on the power information received by the second communication device.

The power feeding system according to the first aspect of the invention may be such that the power feeding installation further has a detection device that detects a value of reflected power at the power supply device, the first communication device sends, as the power information, the detected value of the reflected power to the power receiving unit, and the controller controls the impedance matching device based on the detected value of the reflected power, which has been received by the second communication device.

Further, the power feeding system according to the first aspect of the invention may be such that the controller controls the impedance matching device based on the detected value of the reflected power, which has been received by the second communication device, so as to reduce the reflected power at the power supply device.

Further, the power feeding system according to the first aspect of the invention may be such that the first communication device sends to the power receiving unit a predetermined value of power transmitted from the power feeding installation to the power receiving unit as the power information, and the controller controls the impedance matching device based on the predetermined value received by the second communication device.

Further, the power feeding system according to the first aspect of the invention may be such that the impedance matching device includes a variable impedance circuit, and the controller adjusts an impedance at the variable impedance circuit so that an input impedance at the resonance system is matched to an impedance at a section including the power supply device and adjacent to the resonance system.

Further, the power feeding system according to the first aspect of the invention may be such that the power receiving unit further has a power storage, a charger that is supplied with the power received by the power receiving resonator and charges the power storage, and a rectifier that is provided between the power receiving resonator and the charger, and the impedance matching device is provided between the power receiving resonator and the rectifier.

Further, the power feeding system according to the first aspect of the invention may be such that the controller controls the impedance matching device based on a detected value of power that the charger receives so that the power received by the charger increases.

Further, the power feeding system according to the first aspect of the invention may be such that the power receiving unit is a vehicle.

A vehicle according to a second aspect of the invention is a vehicle to which a power feeding installation wirelessly feeds power. The power feeding installation generates, using a power transmission resonator, an electromagnetic field via which the power is wirelessly transmitted to the vehicle, and sends power information on power at the power feeding installation to the vehicle. The vehicle has a power receiving resonator, an impedance matching device, a communication device, and a controller. The power receiving resonator wirelessly receives the power from the power transmission resonator by resonating with the power transmission resonator via the electromagnetic field. The impedance matching device is used to adjust an impedance at a resonance system that is constituted of the power transmission resonator and the power receiving resonator. The communication device receives the power information sent from the power feeding installation. The controller controls the impedance matching device based on the power information received by the communication device.

The vehicle according to the second aspect of the invention may be such that the power feeding installation has a power supply device that produces power having a predetermined frequency and supplies the power to the power transmission resonator, wherein a value of reflected power at the power supply device is detected in the power feeding installation and the detected value is sent, as the power information, to the vehicle, and the controller controls the impedance matching device based on the detected value of the reflected power, which has been received by the communication device.

Further, the vehicle according to the second aspect of the invention may be such that the controller controls the impedance matching device based on the detected value of the reflected power, which has been received by the communication device, so as to reduce the reflected power at the power supply device.

Further, the vehicle according to the second aspect of the invention may be such that a predetermined value of power transmitted from the power feeding installation to the vehicle is sent, as the power information, from the power feeding installation to the vehicle, and the controller controls the impedance matching device based on the predetermined value received by the communication device.

Further, the vehicle according to the second aspect of the invention may be such that the impedance matching device includes a variable impedance circuit, and the controller adjusts an impedance at the variable impedance circuit so that an input impedance at the resonance system is matched to an impedance at a section including the power supply device of the power feeding installation and adjacent to the resonance system.

Further, the vehicle according to the second aspect of the invention may further have a power storage, a charger that is supplied with the power received by the power receiving resonator and charges the power storage, and a rectifier that is provided between the power receiving resonator and the charger, wherein the impedance matching device is provided between the power receiving resonator and the rectifier.

Further, the vehicle according to the second aspect of the invention may be such that the controller controls the impedance matching device based on a detected value of power that the charger receives so that the power received by the charger increases.

According to the power feeding system according to the first aspect of the invention and the vehicle according to the second aspect of the invention, the power information on power at the power feeding installation is sent from the power feeding installation to the power receiving unit (e.g., the vehicle), and the power receiving unit (e.g., the vehicle) has the impedance matching device that adjusts the impedance at the resonance system that is constituted of the power transmission resonator and the power receiving resonator, and the impedance matching device is controlled based on the power information received from the power feeding installation. Thus, the resonance system impedance adjustment is performed only at the power receiving unit (e.g., the vehicle). According to the power feeding system and vehicle of the invention, thus, it is possible to achieve efficient power feeding using the resonance method with a simple structure.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Hereinafter, example embodiments of the invention will be described in detail with reference to the drawings. Note that identical and corresponding elements in the drawings are denoted by identical reference numerals, and the descriptions on them will not be repeated.

Figure 1:
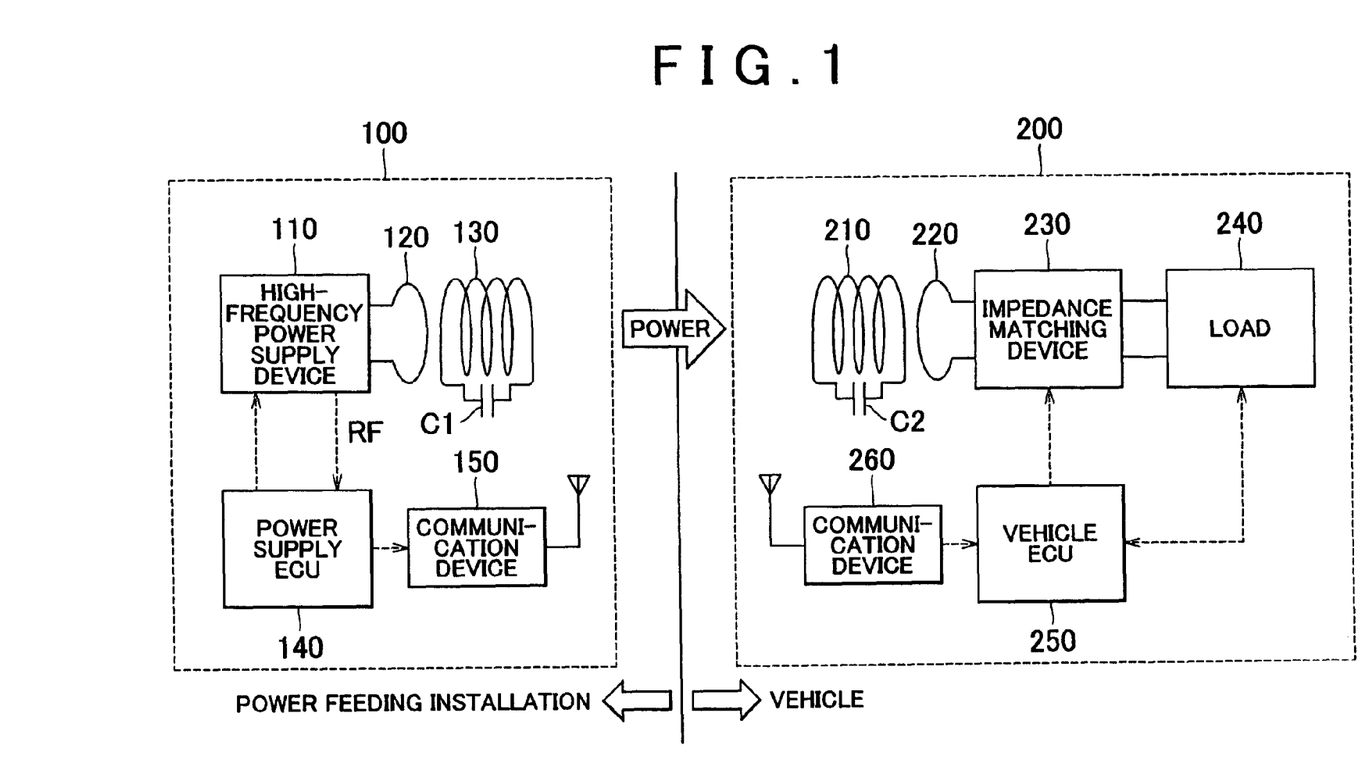
FIG. 1 is a view showing an entire structure of a power feeding system according to a first example embodiment of the invention.

FIG. 1 is a view showing the entire structure of a power feeding system of the first example embodiment of the invention. Referring to FIG. 1, the power feeding system includes a power feeding installation 100 and a vehicle 200. The power feeding installation 100 has a high-frequency power supply device 110, a primary coil 120, a primary self-resonant coil 130, a power supply electronic control unit (ECU) 140, and a communication device 150.

The high-frequency power supply device 110 produces power having a predetermined frequency and supplies the power to the primary coil 120. The power produced by the high-frequency power supply device 110 is the high-frequency power for contactless, or wireless, power transmission from the primary self-resonant coil 130 to a secondary self-resonant coil 210 of the vehicle 200 via the magnetic field resonance therebetween, and the frequency of the high-frequency power is, for example, 1 MHz to a dozen or so MHz.

The high-frequency power supply device 110 has a reflected power sensor (not shown in the drawings). The high-frequency power supply device 110 detects, using the reflected power sensor, reflected power RF occurring during the power supply from the high-frequency power supply device 110 to the primary coil 120 and then outputs the detection result to the power supply ECU 140.

The primary coil 120 is configured to be magnetically coupled with the primary self-resonant coil 130 through electromagnetic induction, and the primary coil 120 supplies, through electromagnetic induction, the primary self-resonant coil 130 with the high-frequency power supplied from the high-frequency power supply device 110.

The primary self-resonant coil 130 is an LC resonant coil that functions as a resonant coil using its inductance and the capacitance of a capacitor C1. The primary self-resonant coil 130 wirelessly transmits power to the secondary self-resonant coil 210 of the vehicle 200 by resonating with the secondary self-resonant coil 210 via an electromagnetic field. The number of turns (windings) of the primary self-resonant coil 130 is properly set based on the distance to the secondary self-resonant coil 210, the resonant frequency of resonance with the secondary self-resonant coil 210, and so on, so that a Q factor indicating the intensity of resonance between the primary self-resonant coil 130 and the secondary self-resonant coil 210 and x indicating the degree of coupling become large. Note that the capacitor C1 may be removed and the floating capacitance of the coil may be used as the capacitance component of the primary self-resonant coil 130.

The power supply ECU 140 controls the high-frequency power supply device 110 such that the high-frequency power supply device 110 produces the power having the predetermined frequency described above. Further, receiving the detected value of the reflected power RF from the high-frequency power supply device 110, the power supply ECU 140 outputs the detected value of the reflected power RF to the communication device 150, and the communication device 150 sends it to the vehicle 200. The communication device 150 is the communication interface used for wireless communication with the communication device 260 of the vehicle 200, and it sends the detected value of the reflected power RF, which has been received from the power supply ECU 140, to the vehicle 200.

On the other hand, the vehicle 200 has the secondary self-resonant coil 210, a secondary coil 220, an impedance matching device 230, a load 240, a vehicle ECU 250, and a communication device 260.

The secondary self-resonant coil 210 is an LC resonant coil that functions as a resonant coil using its inductance and the capacitance of a capacitor C2. The secondary self-resonant coil 210 receives power wirelessly from the primary self-resonant coil 130 of the power feeding installation 100 by resonating with the primary self-resonant coil 130 via an electromagnetic field. The number of turns (windings) of the secondary self-resonant coil 210 is properly set based on the distance to the primary self-resonant coil 130, the resonant frequency, and so on, so that the Q factor and κ become large. Note that the capacitor C2 may be removed and the floating capacitance of the coil may be used as the capacitance component of the secondary self-resonant coil 210.

The secondary coil 220 is configured to be magnetically coupled with the secondary self-resonant coil 210 through electromagnetic induction, and the secondary coil 220 extracts, through electromagnetic induction, the power received by the secondary self-resonant coil 210 and then outputs it to the impedance matching device 230.

The primary coil 120 and the primary self-resonant coil 130 of the power feeding installation 100 and the secondary coil 220 and the secondary self-resonant coil 210 of the vehicle 200 constitute a resonance system, and the impedance matching device 230, which is the circuit for adjusting the impedance in the resonance system, is provided between the secondary coil 220 and the load 240. The impedance in the resonance system can be changed by the vehicle ECU 250 changing the impedance in the impedance matching device 230. The circuit structure of the impedance matching device 230 will be described later.

The load 240 is a set of loads in the vehicle 200 that are supplied with power from the power feeding installation 100. As will be mentioned later, the load 240 includes, for example, a rectifier that rectifies the high-frequency power received by the secondary self-resonant coil 210, a charger that receives the power rectified by the rectifier, and a power storage that is charged by the charger.

The vehicle ECU 250 controls the load 240. For example, when the power feeding installation 100 feeds power to the vehicle 200, the vehicle ECU 250 controls the charger so that the power storage (not shown in the drawings) in the load 240 is charged by the charger (not shown in the drawings) that receives the transmitted power in the load 240.

Further, the vehicle ECU 250 controls the impedance matching device 230 based on the detected value of the reflected power RF at the high-frequency power supply device 110, which has been received by the communication device 260. More specifically, the vehicle ECU 250 adjusts the impedance of the impedance matching device 230 so that the input impedance of the resonance system is matched to the impedance on the high-frequency power supply device 110 side of the resonance system (the impedance of the section including the high-frequency power supply device 110 and adjacent to the resonance system).

The communication device 260 is the communication interface used for wireless communication with the communication device 150 of the power feeding installation 100, and it outputs the detected value of the reflected power RF, which has been received from the power feeding installation 100, to the vehicle ECU 250.

Figure 2:
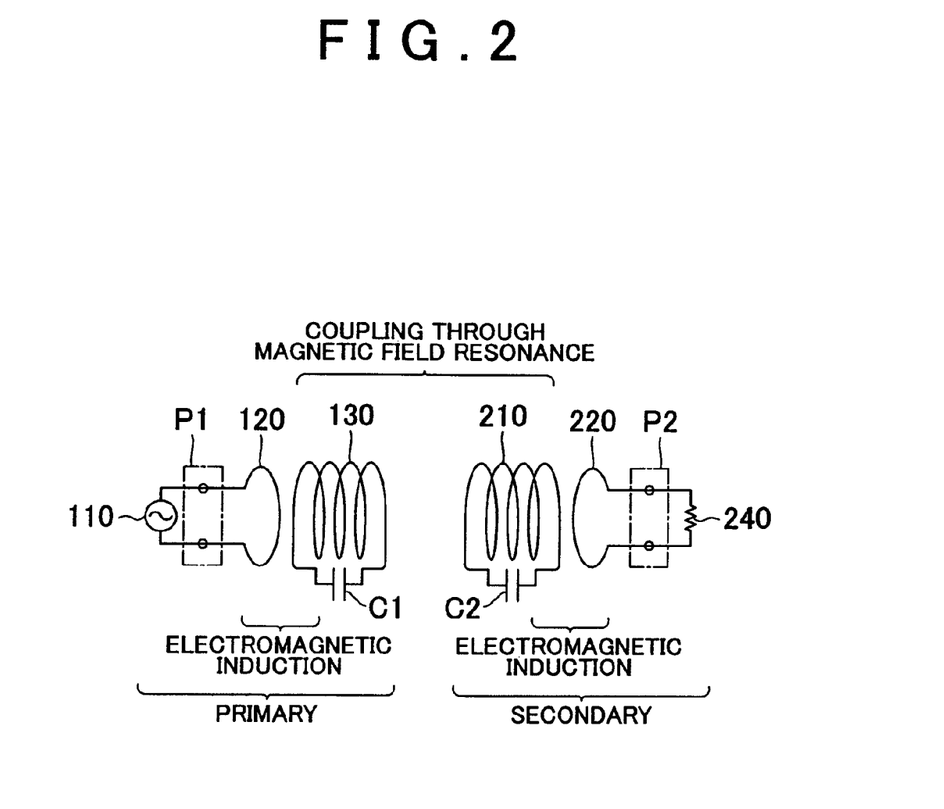
FIG. 2 is an equivalent circuit diagram illustrating the portions of the power feeding system according to the first example embodiment of the invention, which are related to the power transmission using the resonance method.

Next, the principle of the contactless (wireless) power transmission accomplished using the resonance method in the first example embodiment of the invention will be briefly described. FIG. 2 is an equivalent circuit diagram illustrating the portions related to the power transmission using the resonance method. Note that FIG. 2 does not show the impedance matching device 230. Referring to FIG. 2, in the resonance method, like two tuning forks resonate with each other, two LC resonant circuits having equal natural frequencies resonate with each other in an electromagnetic field (near field), whereby power is transmitted from one of the LC circuits to the other via the electromagnetic field.

Specifically, the high-frequency power supply device 110 is connected to the primary coil 120, so that high-frequency power is supplied to the primary self-resonant coil 130 that is magnetically coupled with the primary coil 120 through electromagnetic induction. The primary self-resonant coil 130 resonates with the secondary self-resonant coil 210 having the same resonant frequency as the primary self-resonant coil 130 via an electromagnetic field (near field). Then, the energy (power) is transferred from the primary self-resonant coil 130 to the secondary self-resonant coil 210 via the electromagnetic field. The energy (power) that has been transferred to the secondary self-resonant coil 210 is extracted by the secondary coil 220 that is magnetically coupled with the secondary self-resonant coil 210 through electromagnetic induction, and it is then supplied to the load 240.

The impedance at the resonance system constituted of the primary coil 120, the primary self-resonant coil 130, the secondary coil 220, and the secondary self-resonant coil 210, which are provided between an input port P1 and an output port P2, changes depending on the power supplied from the high-frequency power supply device 110 to the load 240.

Therefore, in the first example embodiment, as shown in FIG. 1, the impedance matching device 230 for adjusting the impedance at the resonance system is provided in the vehicle 200 to which the power feeding installation 100 feeds power. The detected value of the reflected power at the high-frequency power supply device 110 is sent from the power feeding installation 100 to the vehicle 200, and the impedance matching device 230 is controlled based on the detected value of the reflected power in the vehicle 200 so as to adjust the impedance at the resonance system so that the input impedance at the resonance system is matched to the impedance at the section including the high-frequency power supply device 110 and adjacent to the resonance system. More specifically, the impedance matching device 230 is controlled, in the vehicle 200, based on the detected value of the reflected power so as to adjust the impedance at the resonance system so that the reflected power at the high-frequency power supply device 110 is minimized.

Figure 3:
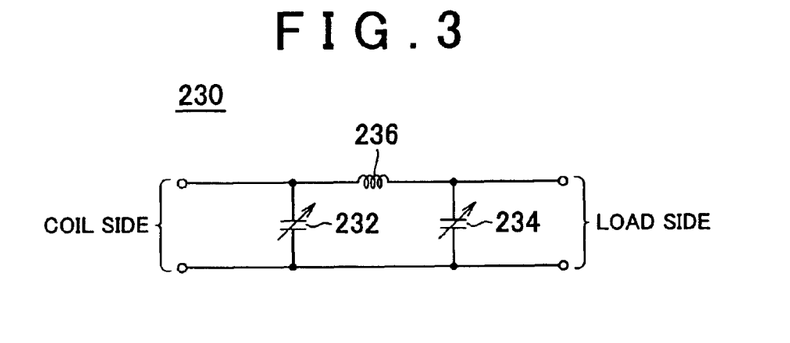
FIG. 3 is a view illustrating, by way of example, a circuit structure of an impedance matching device shown in FIG. 1.

FIG. 3 is a view illustrating, by way of example, the circuit structure of the impedance matching device 230 shown in FIG. 1. Referring to FIG. 3, the impedance matching device 230 has variable capacitors 232 and 234 and a coil 236.

The variable capacitor 232 is connected in parallel to the secondary coil 220 (see FIG. 1). The variable capacitor 234 is connected in parallel to the load 240 (see FIG. 1). The coil 236 is provided between one ends of the variable capacitors 232 and 234, while the other ends of the variable capacitors 232 and 234 are electrically connected to each other.

The impedance at the impedance matching device 230 is changed by changing at least one of the capacitances of the variable capacitors 232 and 234. Note that at least one of the variable capacitors 232 and 234 may be replaced with a non-variable capacitor and a variable coil may be used as the coil 236.

Figure 4:
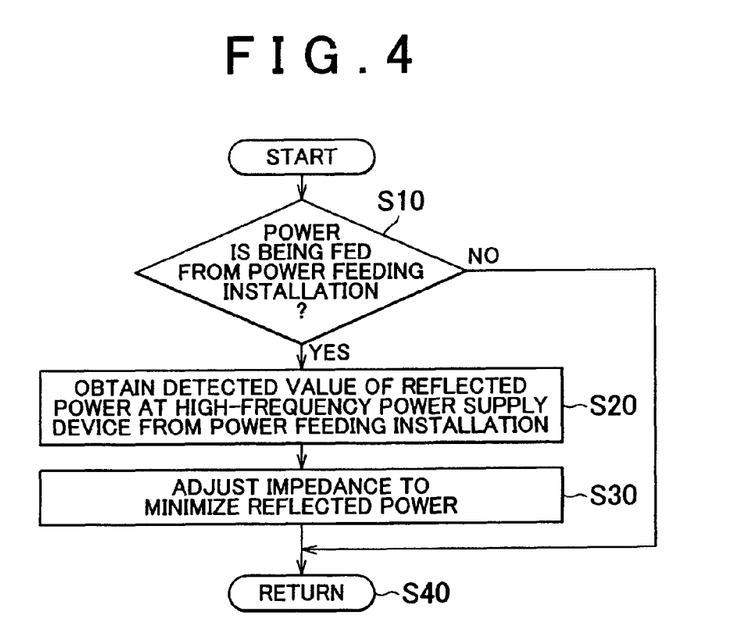
FIG. 4 is a flowchart illustrating an impedance adjustment procedure that is executed by a vehicle ECU shown in FIG. 1.

FIG. 4 is a flowchart illustrating the impedance adjustment procedure that is executed by the vehicle ECU 250 shown in FIG. 1. Referring to FIG. 4, the vehicle ECU 250 determines whether power is being fed from the power feeding installation 100 (step S10). If it is determined that power is not being fed from the power feeding installation 100 ("NO" in step S10), the vehicle ECU 250 proceeds to step S40 without executing the subsequent processes.

On the other hand, if it is determined in step S10 that power is being fed from the power feeding installation 100 ("YES" in step S10), using the communication device 260, the vehicle ECU 250 obtains from the power feeding installation 100 the detected value of the reflected power at the high-frequency power supply device 110 of the power feeding installation 100 (step S20).

Then, by controlling the impedance matching device 230 based on the detected value of the reflected power, the vehicle ECU 250 adjusts the impedance at the resonance system so that the input impedance at the resonance system is matched to the impedance at the section including the high-frequency power supply device 110 and adjacent to the resonance system. More specifically, by controlling the impedance matching device 230 based on the detected value of the reflected power, the vehicle ECU 250 adjusts the impedance at the resonance system so that the reflected power at the high-frequency power supply device 110 is minimized (step S30).

Figure 5:
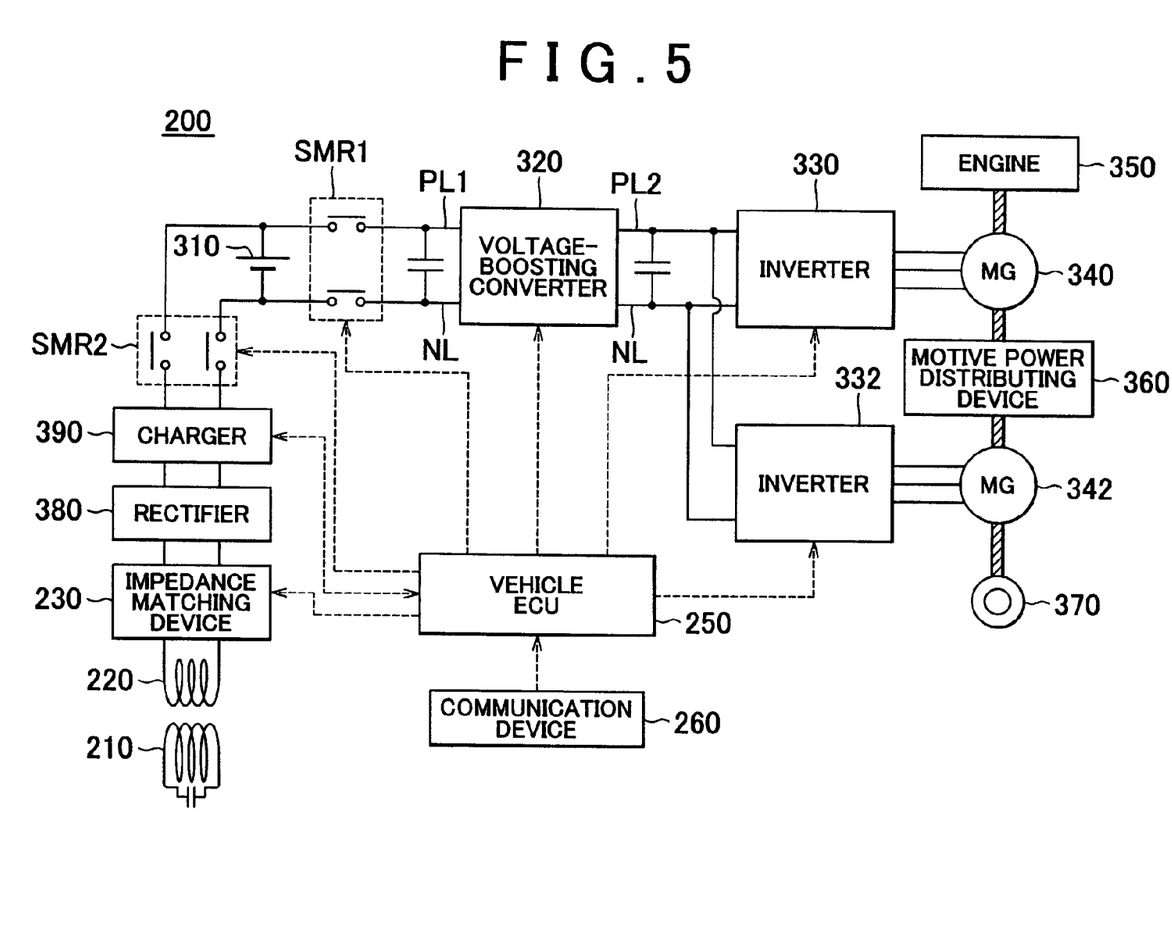
FIG. 5 is a schematic view illustrating, by way of example, the structure of a vehicle shown in FIG. 1, which is a hybrid vehicle.

FIG. 5 is a schematic view illustrating, by way of example, the structure of the vehicle 200 shown in FIG. 1, which is a hybrid vehicle. Referring to FIG. 5, the vehicle 200 has a power storage 310, a system main relay SMR1, a voltage-boosting converter 320, inverters 330 and 332, motor generators 340 and 342, an engine 350, a motive power distributing device 360, and drive wheels 370. Further, the vehicle 200 has the secondary self-resonant coil 210, the secondary coil 220, the impedance matching device 230, a rectifier 380, a charger 390, a system main relay SMR2, the vehicle ECU 250, and the communication device 260.

In the vehicle 200, the engine 350 and the motor generator 342 serve as motive power sources. The engine 350 and the motor generators 340 and 342 are connected to the motive power distributing device 360. The vehicle 200 runs using the drive force produced by at least one of the engine 350 and the motor generator 342. The motive power produced by the engine 350 is distributed to two paths at the motive power distributing device 360. That is, one is the path for transfer to the drive wheels 370, while the other is the path for transfer to the motor generator 340.

The motor generator 340 is an alternating current (AC) rotational electric device, such as a three-phase AC synchronous electric motor with permanent magnets embedded in the rotor. The motor generator 340 generates, via the motive power distributing device 360, power using the kinetic energy generated by the engine 350. For example, when the state of charge (SOC) level of the power storage 310 becomes lower than a predetermined value, the engine 350 is started and the motor generator 340 performs power generation, charging the power storage 310.

The motor generator 342 is also an AC electric rotational device, such as a three-phase AC synchronous electric motor with permanent magnets embedded in the rotor, as the motor generator 340 described above. The motor generator 342 produces drive force using at least one of the power stored in the power storage 310 and the power generated by the motor generator 340. The drive force produced by the motor generator 342 is transferred to the drive wheels 370.

Further, when the vehicle is braked or when the acceleration of the vehicle on a downhill road is reduced, the mechanical energy of the vehicle, including its kinetic energy and potential energy, is used via the drive wheels 370 to rotate the motor generator 342, whereby the motor generator 342 operates as a power generator. In this manner, the motor generator 342 operates as a regeneration brake that produces braking force by converting the mechanical energy of the vehicle into electric power. The power generated by the motor generator 342 is stored in the power storage 310.

The motive power distributing device 360 includes a planetary gearset having a sun gear, pinions, a carrier, and a ring gear. The pinions mesh with the sun gear and the ring gear and are rotatably supported on the carrier. The carrier is coupled with the crankshaft of the engine 350. The sun gear is coupled with the rotational shaft of the motor generator 340. The ring gear is coupled with the rotational shaft of the motor generator 342 and the drive wheels 370.

The system main relay SMR1 is provided between the power storage 310 and the voltage-boosting converter 320 and electrically connects the power storage 310 to the voltage-boosting converter 320 according to the signals from the vehicle ECU 250. The voltage-boosting converter 320 boosts the voltage at a positive line PL2 up to a voltage higher than the output voltage of the power storage 310. The voltage-boosting converter 320 includes, for example, a direct current chopper circuit. The inverters 330 and 332 drive the motor generators 340 and 342, respectively. The invertors 330 and 332 each include, for example, a three-phase bridge circuit.

Regarding the secondary self-resonant coil 210 and the secondary coil 220, refer to the related descriptions made earlier with reference to FIGS. 1 and 2. Regarding the impedance matching device 230, refer to the related descriptions made earlier with reference to FIGS. 1 and 3. The rectifier 380 rectifies the AC power extracted via the secondary coil 220. The system main relay SMR2 is provided between the rectifier 380 and the power storage 310 and electrically connects the rectifier 380 to the power storage 310 according to the signals from the vehicle ECU 250.

In the running mode(s), the vehicle ECU 250 turns the system main relay SMR1 on and turns the system main relay SMR2 off. When propelling the vehicle, the vehicle ECU 250 generates the signals for driving the voltage-boosting converter 320 and the motor generators 340 and 342 based on the accelerator operation amount, the vehicle speed, and various other sensor signals, and then outputs the generated signals to the voltage-boosting converter 320 and the invertors 330 and 332, respectively.

On the other hand, when the power feeding installation 100 (see FIG. 1) feeds power to the vehicle 200, the vehicle ECU 250 turns the system main relay SMR2 on, whereby the power received by the secondary self-resonant coil 210 is supplied to the power storage 310. Further, when the power feeding installation 100 feeds power to the vehicle 200, the vehicle ECU 250 controls the charger 390 and the impedance matching device 230 so as to adjust the impedance at the resonance system as mentioned above.

It is to be noted that the power feeding from the power feeding installation 100 to the vehicle 200 can be performed during the traveling of the vehicle 200 by turning both the system main relays SMR1 and SMR2 on.

Further, it is to be noted that the load 240, which is shown in FIG. 1, is constituted of the rectifier 380 and the components that are provided after the rectifier 380, as viewed from the side where the secondary self-resonant coil 210 is present.

As described above, in the first example embodiment, the detected value of the reflected power at the high-frequency power supply device 110 is sent from the power feeding installation 100 to the vehicle 200, and the vehicle 200 is provided with the impedance matching device 230 that adjusts the impedance at the resonance system constituted of the primary coil 120 and the primary self-resonant coil 130 of the power feeding installation 100 and the secondary coil 220 and the secondary self-resonant coil 210 of the vehicle 200, and the impedance matching device 230 is controlled based on the detected value of the reflected power, which has been received from the power feeding installation 100. That is, the resonance system impedance adjustment is performed only at the vehicle 200. According to the first example embodiment, therefore, it is possible to achieve efficient power feeding with a simple structure.

Next, a modification example of the first example embodiment will be described. In the first example embodiment, the detected value of the reflected power at the high-frequency power supply device 110 is sent from the power feeding installation 100 to the vehicle 200, and the impedance at the resonance system is adjusted based on the detected value of the reflected power, which the vehicle 200 has received.

Meanwhile, as mentioned above, the impedance at the resonance system changes depending on the power supplied from the high-frequency power supply device 110 to the load 240. Therefore, the optimum impedance at the resonance system also changes depending on the power supplied from the high-frequency power supply device 110 to the load 240.

Thus, if the power that is transmitted from the high-frequency power supply device 110 to the load 240 has been determined, the value of the determined power may be sent to the vehicle 200 from the power feeding installation 100, and the impedance at the resonance system may be adjusted in the vehicle 200 according to the value of the determined power.

The entire structure of the power feeding system of the modification example is the same as the power feeding system of the first example embodiment, which is shown in FIG. 1.

Figure 6:
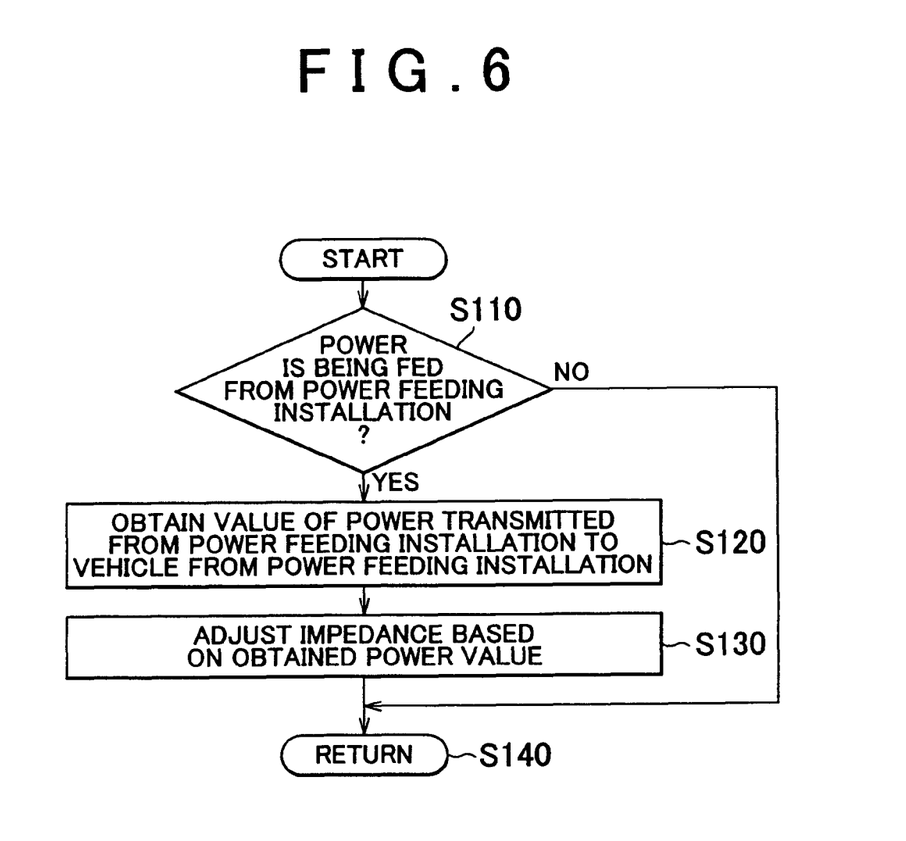
FIG. 6 is a flowchart illustrating the impedance adjustment procedure that is executed by the vehicle ECU in a modification example of the first example embodiment of the invention.

FIG. 6 is a flowchart illustrating the impedance adjustment procedure that is executed by the vehicle ECU 250 in the modification example. Referring to FIG. 6, if it is determined that power is being fed from the power feeding installation 100 ("YES" in step S110), using the communication device 260, the vehicle ECU 250 obtains from the power feeding installation 100 the value of the power transmitted from the power feeding installation 100 to the vehicle 200 (step S120). More specifically, in this modification example, the value of the power transmitted from the high-frequency power supply device 110 to the load 240 is predetermined, and the value of the predetermined power is sent from the power feeding installation 100 to the vehicle 200, and the communication device 260 of the vehicle 200 receives it.

Then, the vehicle ECU 250 adjusts the impedance at the resonance system by controlling the impedance matching device 230 based on the predetermined value (step S130). More specifically, the vehicle ECU 250 controls the impedance matching device 230 based on the predetermined value obtained from the power feeding installation 100 so as to adjust the impedance at the resonance system so that the input impedance at the resonance system is matched to the impedance at the section including the high-frequency power supply device 110 and adjacent to the resonance system.

As mentioned above, the impedance at the resonance system changes depending on the power supplied from the high-frequency power supply device 110 to the load 240. Thus, for example, the impedance at the resonance system can be adjusted by determining in advance the amount of impedance adjustment by the impedance matching device 230, in accordance with the power transmitted from the high-frequency power supply device 110 to the load 240, and then controlling the impedance matching device 230 based on the power value obtained from the power feeding installation 100.

According to the modification example described above, the same effects as those of the first example embodiment can be achieved.

In the first example embodiment and the modification example, the impedance at the resonance system is adjusted based on the information on the power at the power feeding installation 100 (i.e., the detected value of the reflected power in the first example embodiment, and the value of power transmitted from the power feeding installation 100 to the vehicle in the modification example). Meanwhile, in the second example embodiment, the power supplied from the power feeding installation 100 to the vehicle 200 is constant, and the impedance at the resonance system is adjusted based on the power that the load 240 in the vehicle 200 (see FIG. 1) receives.

Although the entire structure of the power feeding system of the second example embodiment is basically the same as the power feeding system of the first example embodiment, which is shown in FIG. 1, the communication device 150 of the power feeding installation 100 and the communication device 260 of the vehicle 200 may be removed in the second example embodiment.

Figure 7:
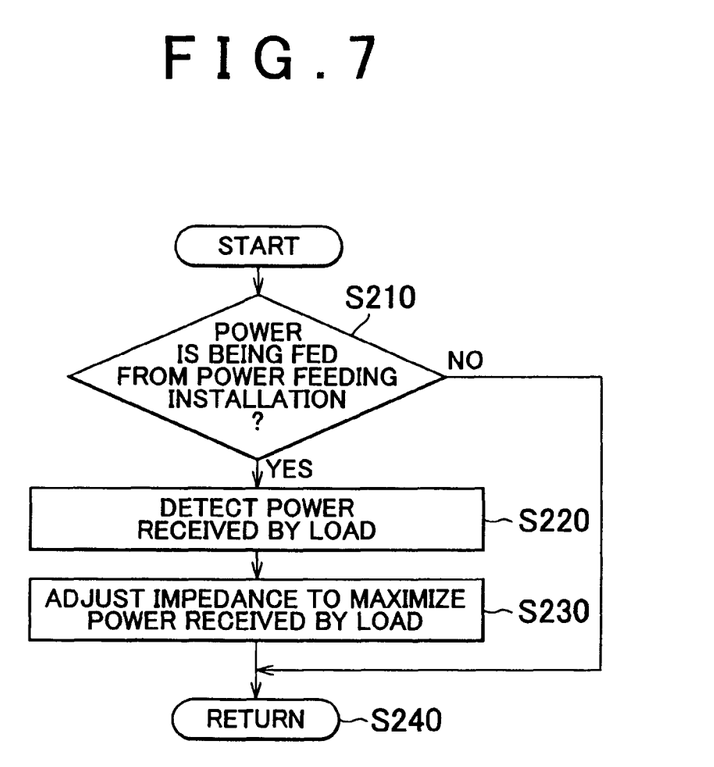
FIG. 7 is a flowchart illustrating the impedance adjustment procedure that is executed by the vehicle ECU in the second example embodiment of the invention.

FIG. 7 is a flowchart illustrating the impedance adjustment procedure that is executed by the vehicle ECU 250 in the second example embodiment. Referring to FIG. 7, if it is determined that power is being fed from the power feeding installation 100 ("YES" in step S210), the vehicle ECU 250 detects the power that the load 240 (see FIG. 1) is receiving (step S220). For example, at this time, the power is detected at the charger 390 (see FIG. 5), and the value of the detected power is output to the vehicle ECU 250.

Then, the vehicle ECU 250 controls the impedance matching device 230 based on the detected power that the load 240 is receiving, so as to adjust the impedance at the resonance system so that the input impedance at the resonance system is matched to the impedance at the section including the high-frequency power supply device 110 and adjacent to the resonance system. More specifically, at this time, the vehicle ECU 250 controls the impedance matching device 230 based on the power that the load 240 (e.g., the charger 390) is receiving, so as to adjust the impedance at the resonance system so that the power that the load 240 (e.g., the charger 390) is receiving is maximized (step S230).

Thus, in the second example embodiment, too, the resonance system impedance adjustment is performed only at the vehicle 200, and therefore it is possible to achieve efficient power feeding with a simple structure.

While the power information is sent from the power feeding installation 100 to the vehicle 200 via the communication devices 150 and 260 in the first example embodiment and the modification example, it is to be noted that the power information can be sent from the power feeding installation 100 to the vehicle 200 also by, for example, superimposing signals indicating the power information on the power transmitted from the power feeding installation 100 to the vehicle 200.

Further, while power is fed to the primary self-resonant coil 130 through electromagnetic induction using the primary coil 120 and power is extracted from the secondary self-resonant coil 210 through electromagnetic induction using the secondary coil 220 in the first example embodiment, the modification example, and the second example embodiment, it is to be noted that the primary coil 120 may be removed and power may be directly supplied from the high-frequency power supply device 110 to the primary self-resonant coil 130, and that the secondary coil 220 may be removed and power may be directly extracted from the secondary self-resonant coil 210.

Further, while the power transmission is performed through the resonance between the pair of self-resonant coils in the first example embodiment, the modification example, and the second example embodiment, it is to be noted that a pair of high-dielectric constant material disks may be used as the resonators in place of the pair of self-resonant coils. The high-dielectric constant material disks are made of a high-dielectric constant material(s), such as $TiO_2$, $BaTi_4O_9$, and $LiTaO_3$.

Further, in the first example embodiment, the modification example, and the second example embodiment, the vehicle 200 is a series-parallel type hybrid vehicle in which the motive power of the engine 350 is distributed using the motive power distributing device 360 and then transferred to the drive wheels 370 and the motor generator 340. It is to be noted that the invention may be applied also to hybrid vehicles of various other types. That is, for example, the invention may be applied also to so-called series type hybrid vehicles that use the engine 350 only for driving the motor generator 340 and produces the drive force for propelling the vehicle using only the motor generator 342, hybrid vehicles in which only the regenerated energy, included in the kinetic energy generated by the engine 350, is recovered in the form of electric energy, and motor-assist type hybrid vehicles in which the engine is used as the main motive power source and the motor is used to assist the engine as needed. Further, the invention may be applied also to electric vehicles that have no internal combustion engine and run on electric power only, and fuel-cell vehicles that include, as a direct current power source, a fuel cell in addition to the power storage 310.

It is to be noted that, in the first example embodiment, the modification example, and the second example embodiment, the vehicle 200 may be regarded as an example of "power receiving unit" in the invention, the high-frequency power supply device 110 may be regarded as an example of "power supply device" in the invention, the primary self-resonant coil 130 and the primary coil 120 may be collectively regarded as an example of "power transmission resonator" in the invention, the secondary self-resonant coil 210 and the secondary coil 220 may be collectively regarded as an example of "power receiving resonator" in the invention, the communication device 150 may be regarded as an example of "first communication device" in the invention, the communication device 260 may be regarded as an example of "second communication device" and an example of "communication device" in the invention, and the vehicle ECU 250 may be regarded as an example of "controller" in the invention.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A power feeding system, comprising:
a power feeding installation; and
a power receiving unit to which the power feeding installation feeds power; wherein:
the power feeding installation has:
a power supply device that produces power having a predetermined frequency a power transmission resonator that receives the power produced by the power supply device and generates an electromagnetic field via which the power is wirelessly transmitted to the power receiving unit, and
a first communication device that sends power information on power at the power feeding installation to the power receiving unit; and
the power receiving unit has:
a power receiving resonator that wirelessly receives the power from the power transmission resonator by resonating with the power transmission resonator via the electromagnetic field,
an impedance matching device that includes a variable impedance circuit so as to be capable of adjusting an impedance at a resonance system that is constituted of the power transmission resonator and the power receiving resonator,
a second communication device that receives the power information sent from the first communication device, and a controller that controls the impedance matching device based on the power information received by the second communication device, said controller being capable of adjusting an impedance at the variable impedance circuit so that an input impedance at the resonance system is matched to an impedance at a section including the power supply device and adjacent to the resonance system.

2. The power feeding system according to claim 1, wherein:
the power feeding installation further has a detection device that detects a value of reflected power at the power supply device;
the first communication device sends, as the power information, the detected value of the reflected power to the power receiving unit; and
the controller controls the impedance matching device based on the detected value of the reflected power, which has been received by the second communication device.

3. The power feeding system according to claim 2, wherein the controller controls the impedance matching device based on the detected value of the reflected power, which has been received by the second communication device, so as to reduce the reflected power at the power supply device.

4. The power feeding system according to claim 1, wherein:
the first communication device sends to the power receiving unit a predetermined value of power transmitted from the power feeding installation to the power receiving unit as the power information; and
the controller controls the impedance matching device based on the predetermined value received by the second communication device.

5. The power feeding system according to claim 1, wherein:
the impedance matching device has a group of dipoles comprised of capacitors and a coil, wherein at least one of said dipoles has a variable capacitance or inductance.

6. The power feeding system according to claim 1, wherein:
the power receiving unit further has a power storage, a charger that is supplied with the power received by the power receiving resonator and charges the power storage, and a rectifier that is provided between the power receiving resonator and the charger; and
the impedance matching device is provided between the power receiving resonator and the rectifier.

7. The power feeding system according to claim 6, wherein the controller controls the impedance matching device based on a detected value of power that the charger receives so that the power received by the charger increases.

8. The power feeding system according to claim 1, wherein the power receiving unit is a vehicle.

9. A vehicle to which a power feeding installation wirelessly feeds power, wherein the power feeding installation generates, using a power transmission resonator, an electromagnetic field via which the power is wirelessly transmitted to the vehicle, and sends power information on power at the power feeding installation to the vehicle, the vehicle comprising:

a power receiving resonator that wirelessly receives the power from the power transmission resonator by resonating with the power transmission resonator via the electromagnetic field;
an impedance matching device that includes a variable impedance circuit so as to be capable of adjusting an impedance at a resonance system that is constituted of the power transmission resonator and the power receiving resonator;
a communication device that receives the power information sent from the power feeding installation; and
a controller that controls the impedance matching device based on the power information received by the communication device, said controller being capable of adjusting an impedance at the variable impedance circuit so that an input impedance at the resonance system is matched to an impedance at a section including the power supply device of the power feeding installation and adjacent to the resonance system.

10. The vehicle according to claim 9, wherein:
the power feeding installation has a power supply device that produces power having a predetermined frequency and supplies the power to the power transmission resonator, wherein a value of reflected power at the power supply device is detected in the power feeding installation and the detected value is sent, as the power information, to the vehicle; and
the controller controls the impedance matching device based on the detected value of the reflected power, which has been received by the communication device.

11. The vehicle according to claim 10, wherein the controller controls the impedance matching device based on the detected value of the reflected power, which has been received by the communication device, so as to reduce the reflected power at the power supply device.

12. The vehicle according to claim 9, wherein:
a predetermined value of power transmitted from the power feeding installation to the vehicle is sent, as the power information, from the power feeding installation to the vehicle; and
the controller controls the impedance matching device based on the predetermined value received by the communication device.

13. The vehicle according to claim 9, wherein:
the impedance matching device has a group of dipoles comprised of capacitors and a coil, wherein at least one of said dipoles has a variable capacitance or inductance.

14. The vehicle according to claim 9, further comprising:
a power storage;
a charger that is supplied with the power received by the power receiving resonator and charges the power storage; and
a rectifier that is provided between the power receiving resonator and the charger, wherein the impedance matching device is provided between the power receiving resonator and the rectifier.

15. The vehicle according to claim 14, wherein the controller controls the impedance matching device based on a detected value of power that the charger receives so that the power received by the charger increases.

* * * * *